(12) United States Patent
Lin

(10) Patent No.: US 11,175,753 B2
(45) Date of Patent: Nov. 16, 2021

(54) MOUSE

(71) Applicant: Cheng Uei Precision Industry Co., Ltd., New Taipei (TW)

(72) Inventor: Li Wen Lin, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 17/206,889

(22) Filed: Mar. 19, 2021

(65) Prior Publication Data

US 2021/0303085 A1 Sep. 30, 2021

(30) Foreign Application Priority Data

Mar. 31, 2020 (CN) .......................... 202020440275.8

(51) Int. Cl.
*G06F 3/0354* (2013.01)
(52) U.S. Cl.
CPC ................................ *G06F 3/03543* (2013.01)
(58) Field of Classification Search
CPC .................................................. G06F 3/03543
USPC .......................................................... 345/163
See application file for complete search history.

(56) References Cited

U.S. PATENT DOCUMENTS

| | | | |
|---|---|---|---|
| 2013/0221817 A1* | 8/2013 | Lee .......................... | G06F 3/039 312/223.2 |
| 2013/0321999 A1* | 12/2013 | Lee ...................... | G06F 3/03543 361/679.4 |
| 2016/0113375 A1* | 4/2016 | Lim ..................... | A45D 34/042 401/118 |

* cited by examiner

*Primary Examiner* — Mark Edwards
(74) *Attorney, Agent, or Firm* — Lin & Associates Intellectual Property, Inc.

(57) ABSTRACT

A mouse includes a main body, a supporting component, a stopping structure and an elastic component. The main body has a receiving chamber penetrating through one end of the main body. An upper portion of the main body is equipped with a magnetic attraction component located to a top of the receiving chamber. The supporting component is slidably arranged in the receiving chamber to be retracted into or be pulled out from the receiving chamber. A top of the supporting component is equipped with a magnetic attraction element. The stopping structure is arranged between the main body and the supporting component for limiting the supporting component from being retracted into the main body. One end of the elastic component is connected to the main body, and the other end of the elastic component is connected to the supporting component.

18 Claims, 11 Drawing Sheets

MOUSE

CROSS-REFERENCE TO RELATED APPLICATION

The present application is based on, and claims priority from, China Patent Application No. 202020440275.8, filed Mar. 31, 2020, the disclosure of which is hereby incorporated by reference herein in its entirety.

BACKGROUND OF THE INVENTION

1. Field of the Invention

The present invention generally relates to a computer accessory, and more particularly to a mouse.

2. The Related Art

Nowadays, computers have become indispensable tools for people's work and people's lives. Many business people often need to go on business trips, and the computers are as essential office tools which must be carried around for almost every business trips, correspondingly, mouses as essential computer accessories are also needed to be carried together. Therefore, the smaller sizes the mouses and the computers have, the more portable the mouses and the computers are. However, if the sizes of the mouses are too small, a hand feeling of using the mouse of a user will be affected, so it is difficult to keep a better hand feeling of using the mouse of the user at the same time of the mouse being more portable.

Therefore, it is necessary to provide an innovative mouse that is carried conveniently, and a usage hand feeling of the mouse of the user is without being affected.

SUMMARY OF THE INVENTION

An object of the present invention is to provide a mouse. The mouse includes a main body, a supporting component, a stopping structure and an elastic component. The main body has a receiving chamber penetrating through one end of the main body. An upper portion of the main body is equipped with a magnetic attraction component located to a top of the receiving chamber. An inside of the main body is equipped with two magnetic attraction parts accommodated in a middle of the receiving chamber. Middles of upper portions of inner surfaces of two sides of the main body protrude towards each other to form two restricting portions. The supporting component is slidably arranged in the receiving chamber to be retracted into or be pulled out from the receiving chamber of the main body. In a process of the supporting component sliding along the main body, two sides of a top surface of a rear end of the supporting component are blocked by the two restricting portions. A top of the supporting component is equipped with a magnetic attraction element. A lower portion of a middle of the supporting component is equipped with two magnetic attraction structures. The stopping structure is arranged between the main body and the supporting component for limiting the supporting component from being retracted into the main body. One end of the elastic component is connected to the main body, and the other end of the elastic component is connected to the supporting component. When the supporting component is pulled out to be in place, the elastic component is stretched, and the magnetic attraction element moves outward and along with the supporting component to a position towards the magnetic attraction component, the supporting component moves upward under a magnetic force action between the magnetic attraction component and the magnetic attraction element, and the stopping structure limits the supporting component which moves upward from sliding into the receiving chamber by limiting the supporting component moving upward, correspondingly, the stopping structure limits the supporting component which moves upward from being retracted into the receiving chamber by limiting the supporting component moving upward, when the supporting component which is located at a pull-out status is pressed downward, the magnetic attraction element moves downward and away from the magnetic attraction component and the stopping structure is disengaged from the supporting component to loose a limitation on the supporting component, the supporting component is driven by a restoring force of the elastic component to slide backward into the receiving chamber, correspondingly, the supporting component is driven by the restoring force of the elastic component to be retracted into the receiving chamber. When the supporting component is retracted into the receiving chamber, the two magnetic attraction structures move inward along with the supporting component, and the two magnetic attraction structures are attracted with the two magnetic attraction parts.

Another object of the present invention is to provide a mouse. The mouse includes a main body, a supporting component, a stopping structure and an elastic component. The main body has a receiving chamber penetrating through one end of the main body. An upper portion of the main body is equipped with a magnetic attraction component located to a top of the receiving chamber. An inside of the main body is equipped with two magnetic attraction parts accommodated in a middle of the receiving chamber. Inner surfaces of two sides of the main body are recessed oppositely to form two guiding slots arranged at two opposite side walls of the receiving chamber. Middles of the two guiding slots are recessed oppositely to form two gaps. The supporting component is slidably arranged in the receiving chamber to be retracted into or be pulled out from the receiving chamber of the main body. A top of the supporting component is equipped with a magnetic attraction element. A lower portion of a middle of the supporting component is equipped with two magnetic attraction structures. Several portions of two sides of the supporting component protrude outward to form a plurality of guiding portions. The plurality of the guiding portions are able to slide in the two corresponding guiding slots for guiding the supporting component to be retracted into or pulled out from the main body. The two gaps decrease contacting areas among the plurality of the guiding portions and inner walls of the two guiding slots. The stopping structure is arranged between the main body and the supporting component for limiting the supporting component from being retracted into the main body. One end of the elastic component is connected to the main body, and the other end of the elastic component is connected to the supporting component. When the supporting component is pulled out to be in place, the elastic component is stretched, and the magnetic attraction element moves outward and along with the supporting component to a position towards the magnetic attraction component, the supporting component moves upward under a magnetic force action between the magnetic attraction component and the magnetic attraction element, and the stopping structure limits the supporting component which moves upward from sliding into the receiving chamber by limiting the supporting component moving upward, correspondingly, the stopping structure limits the supporting component which moves upward from being retracted into the receiving chamber by limiting the supporting component moving upward, when the supporting component which is located at a pull-out status is pressed downward, the magnetic attraction element moves downward and away from the magnetic attraction component and the stopping structure is disengaged from the supporting component to loose a limitation on the supporting component, the supporting component is driven by the restoring force of the elastic component to be retracted into the receiving chamber, when the supporting component is retracted into the receiving chamber, the two magnetic attraction structures move inward along with the supporting component, and the two magnetic attraction structures are attracted with the two magnetic attraction parts.

Another object of the present invention is to provide a mouse. The mouse includes a main body, two guiding components, a supporting component and an elastic component. The main body has a receiving chamber penetrating through one end of the main body. An upper portion of the main body is equipped with a magnetic attraction component located to a top of the receiving chamber. The two guiding components are fastened to two sides of the receiving chamber. Middles of inner surfaces of the two guiding components are recessed oppositely to form two guiding slots. Several portions of tops of front ends of the two guiding slots protrude upward to form a plurality of up-shift slots. A rear wall of each up-shift slot forms a retaining wall. Middles of upper portions of inner surfaces of the two guiding components protrude towards each other to form two restricting portions. The supporting component is slidably arranged in the receiving chamber to be retracted into or be pulled out from the receiving chamber. The supporting component has an extending portion, and a connecting portion connected with a lower portion of an inner end surface of the extending portion. A top of the supporting component is equipped with a magnetic attraction element. Several portions of two sides of the supporting component protrude outward to form a plurality of guiding portions. The plurality of the guiding portions are able to slide in the two corresponding guiding slots. In a process of the supporting component sliding along the two guiding components, the plurality of the guiding portions are guided in the two guiding slots, and the two restricting portions abut against two sides of a top surface of the connecting portion, so the two sides of the top surface of the connecting portion are blocked by the two restricting portions. One end of the elastic component is connected to the main body, and the other end of the elastic component is connected to the supporting component. When the supporting component is pulled out to be in place, the elastic component is stretched, and the magnetic attraction element moves outward and along with the supporting component to a position towards the magnetic attraction component, the supporting component moves upward under a magnetic force action between the magnetic attraction component and the magnetic attraction element, when the supporting component moves upward, the plurality of the guiding portions move upward into the plurality of the up-shift slots and then are blocked by the retaining walls of the plurality of the up-shift slots, when the supporting component which is located at a pull-out status is pressed downward, the magnetic attraction element moves downward and away from the magnetic attraction component, the plurality of the guiding portions move downward into the plurality of the guiding slots, the supporting component is driven by the restoring force of the elastic component to be retracted into the receiving chamber.

As described above, the mouse includes the supporting component which is able to be retracted into or slide out from the main body, so the mouse is used by virtue of pulling out the supporting component from the main body, and when the mouse has no need of being used, the supporting component is able to be retracted into the main body for reaching a purpose of reducing a volume, consequently, the mouse is carried conveniently, the mouse truly reaches to be compatible with a portability and a better usage hand feeling, and a usage joy of a user is able to be improved, when the mouse is pulled out in place, an instantaneous location of the supporting component is able to be realized by an action of the magnetic force between the magnetic attraction component and the two magnetic attraction elements to improve a usage experience of the user. Furthermore, the supporting component and the elastic component are stopped by the stopping structure to be limited from sliding into the receiving chamber, and because the elastic component is disposed between the supporting component and the main body, when the supporting component is retracted into the main body in need, an outer portion of the supporting component is needed to be pressed lightly, and then the supporting component is retracted into the receiving chamber automatically under an action of the restoring force of the elastic component, an operation of the mouse is simple and convenient, and the usage joy of the user is increased. In addition, when the mouse is in a usage status, the supporting component and the main body are able to be supported on a usage platform together, because the magnetic attraction component is arranged on the top of the receiving chamber, and the two magnetic attraction elements are arranged on the top of the supporting component so as to ensure that the supporting component is without being retracted into the main body on account of being easily and accidentally pressed on the mouse in use, and ensure a usage reliability of the mouse. As a result, the mouse is carried conveniently, and the usage hand feeling of the mouse of the user is also without being affected.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
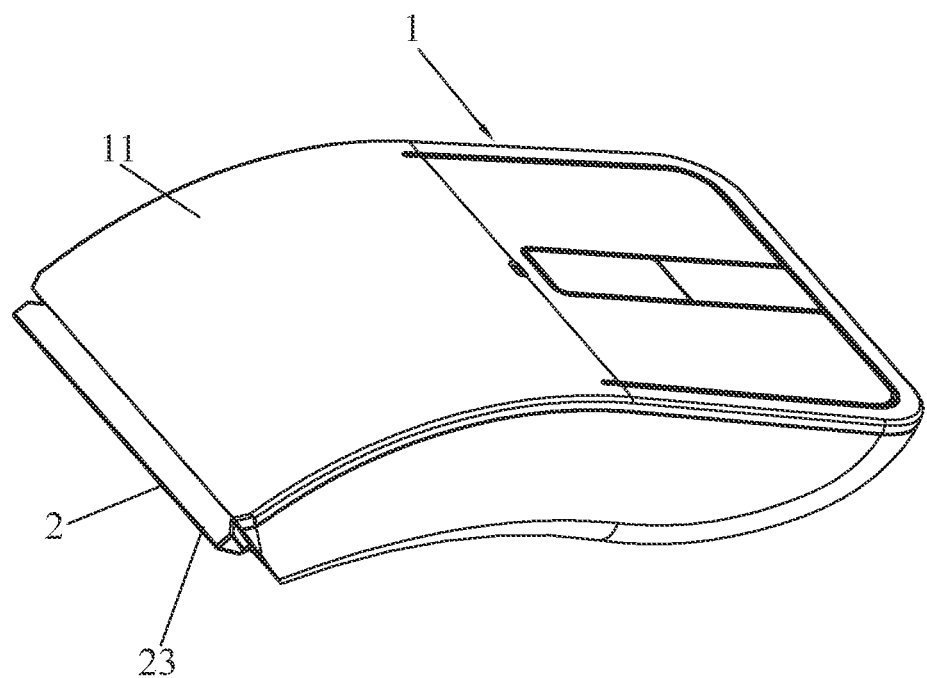
FIG. 1 shows a structure diagram of a mouse in accordance with the present invention, wherein the mouse is located in a retracted status.
Figure 2:
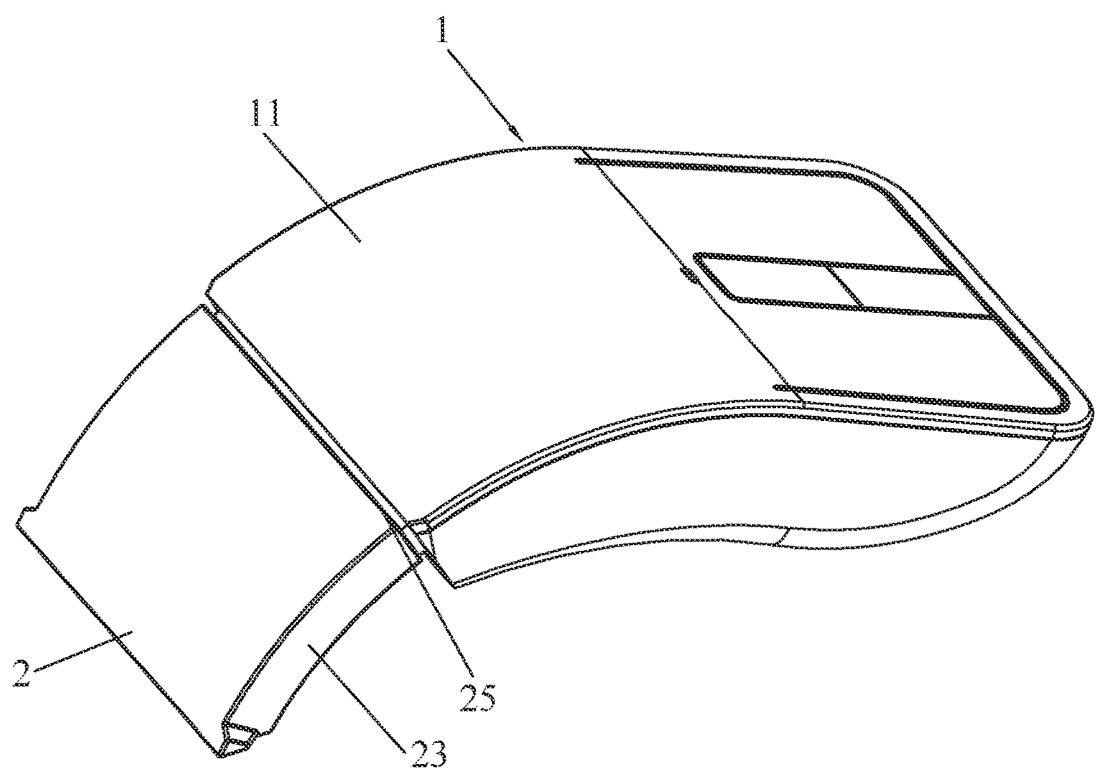
FIG. 2 shows another structure diagram of the mouse in accordance with the present invention, wherein the mouse is located at a pull-out status.
Figure 3:
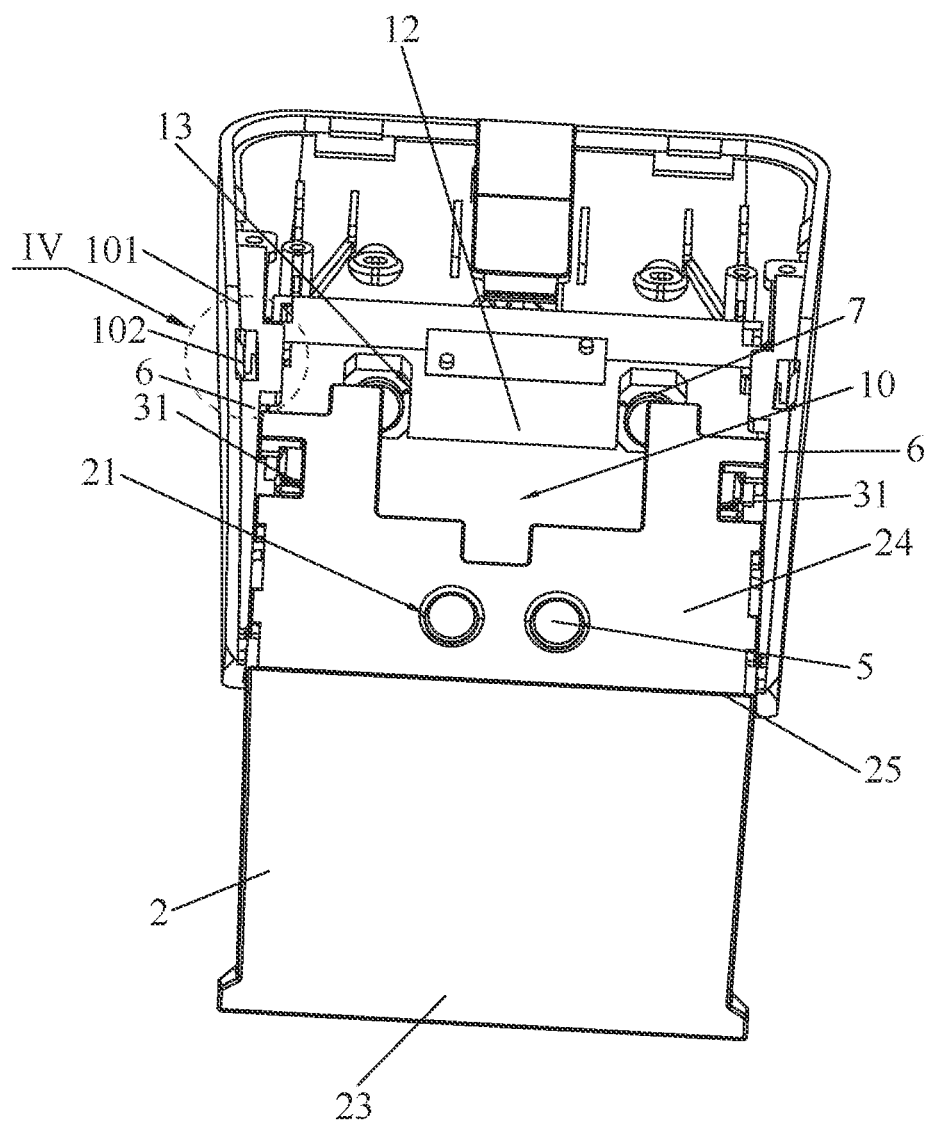
FIG. 3 shows a partial structure diagram of the mouse of FIG. 2, wherein the mouse is located at the pull-out status and is partially hidden.
Figure 4:
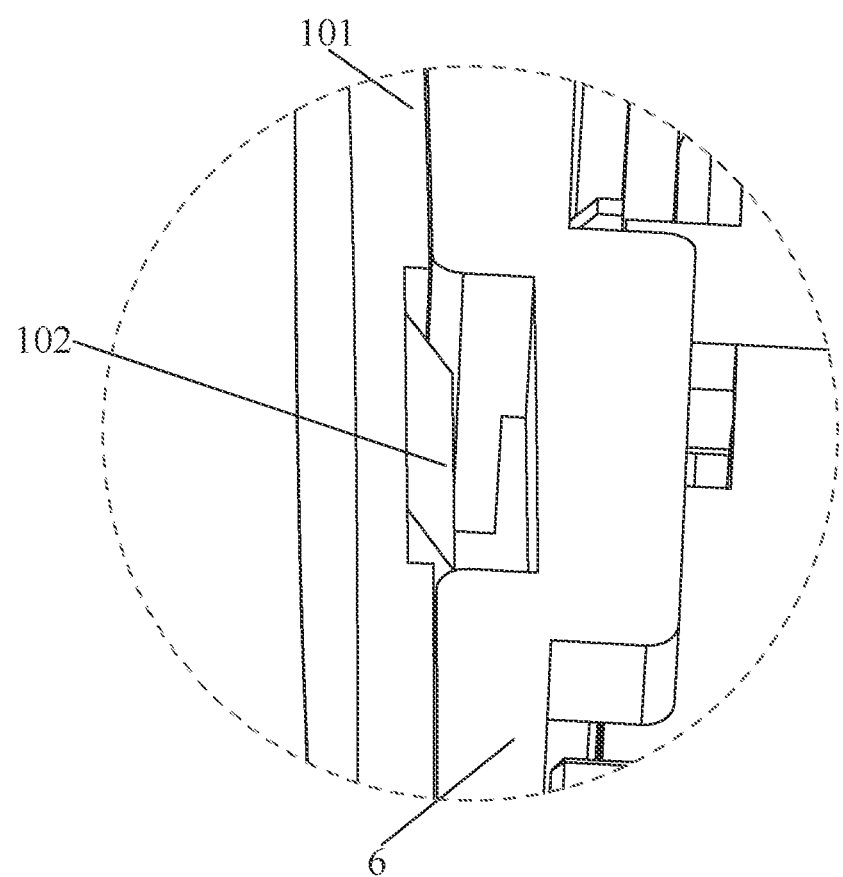
FIG. 4 is an enlarged view of an encircled portion IV of the mouse of FIG. 3, wherein the mouse is located at the pull-out status and is partially hidden.
Figure 5:
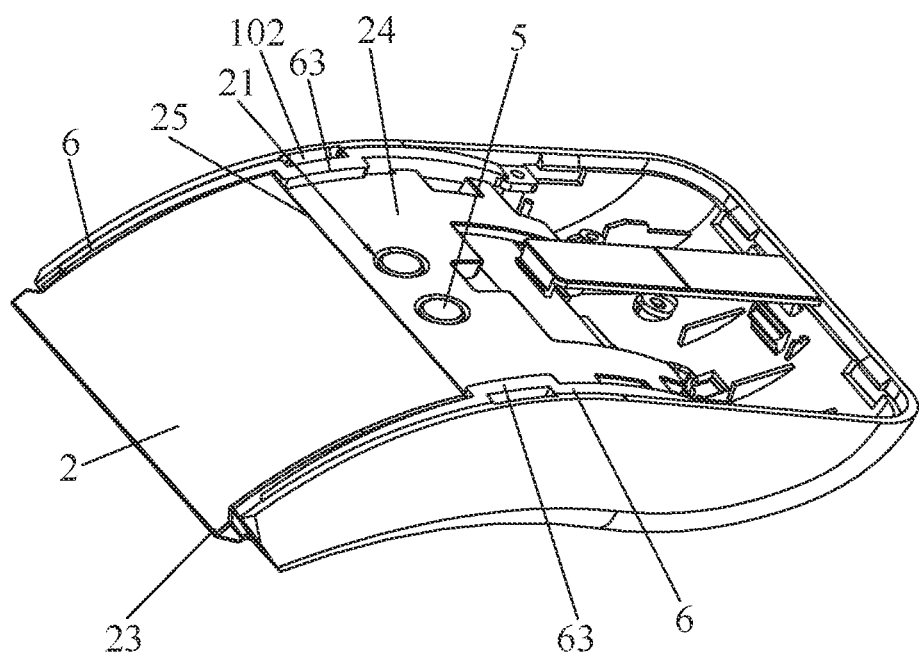
FIG. 5 shows another partial structure diagram of the mouse of FIG. 1, wherein the mouse is located at the retracted status and is partially hidden.
Figure 6:
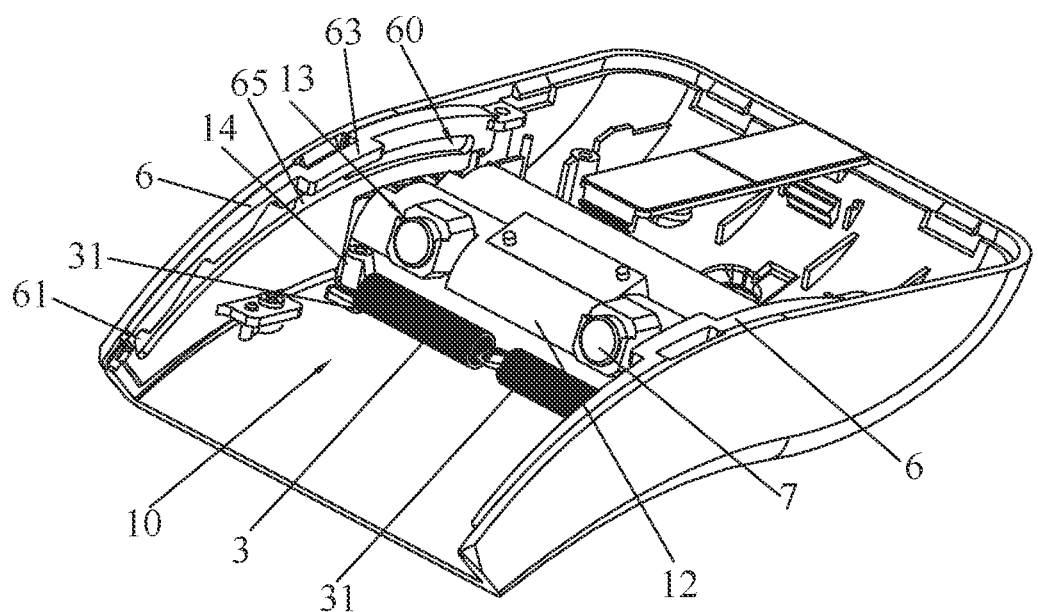
FIG. 6 shows one more partial structure diagram of the mouse of FIG. 1, wherein the mouse is partially hidden.
Figure 7:
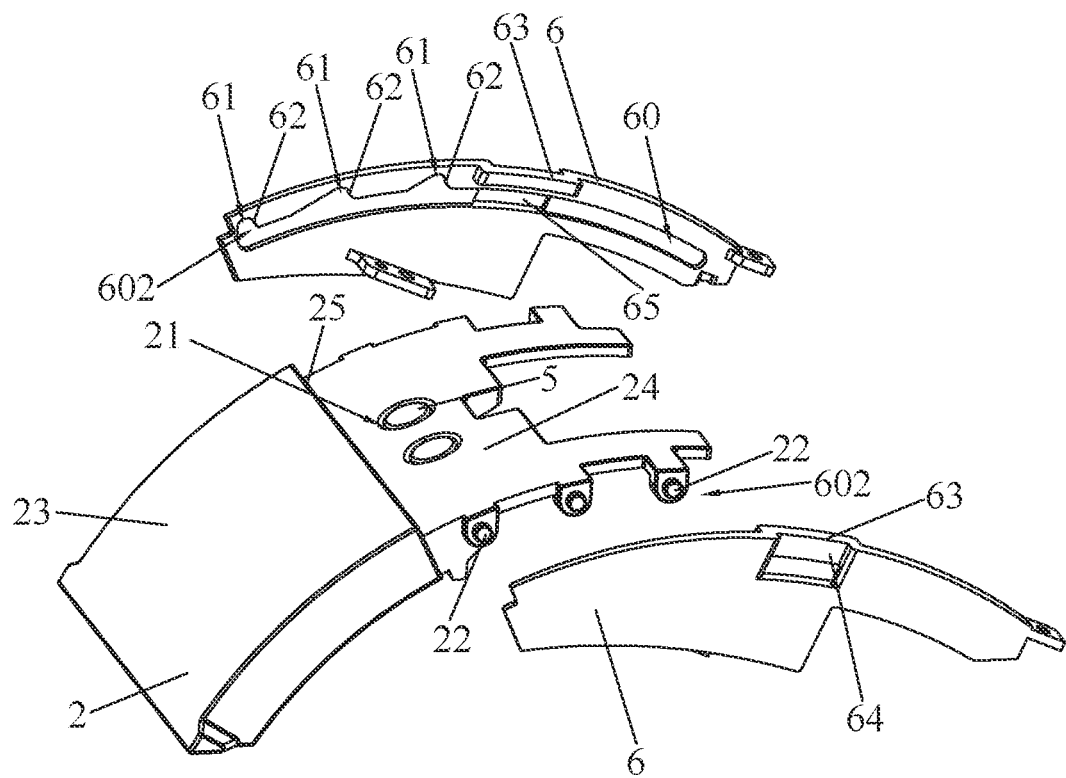
FIG. 7 is a partially exploded view of the mouse in accordance with the present invention.
Figure 8:
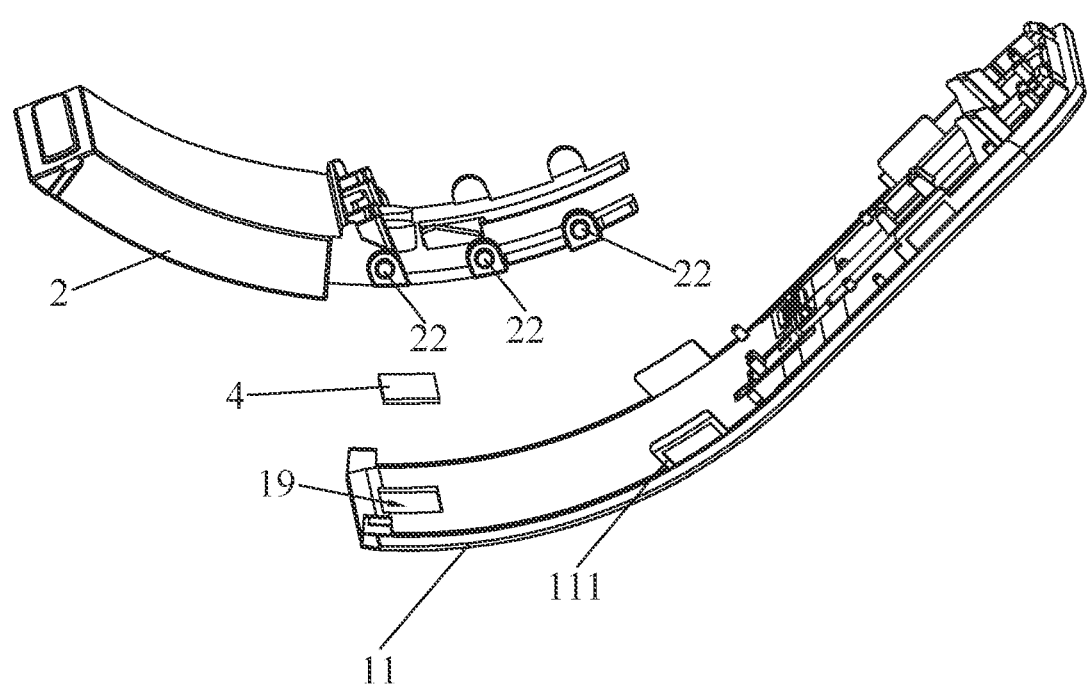
FIG. 8 is another partially exploded view of the mouse in accordance with the present invention.
Figure 9:
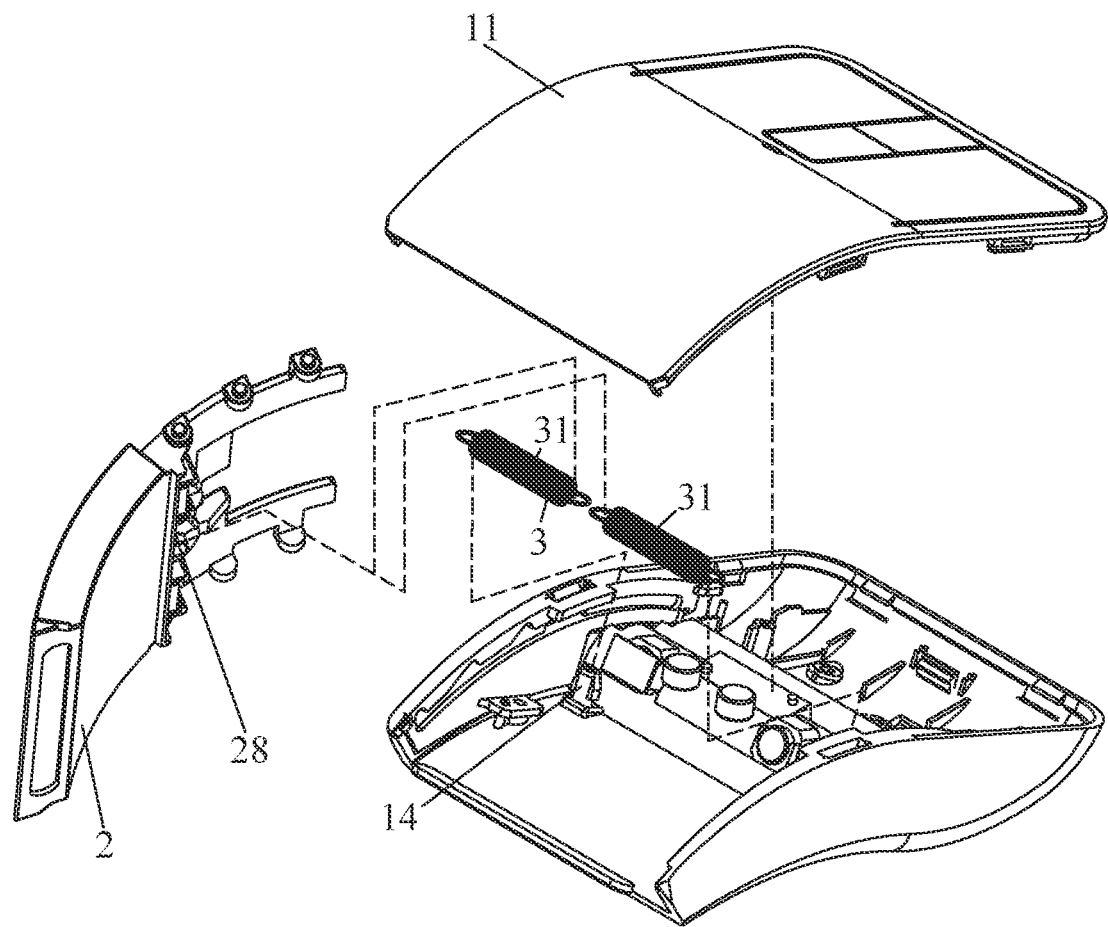
FIG. 9 is one more partially exploded view of the mouse in accordance with the present invention.

Referring to FIG. 1 to FIG. 9, a mouse 100 in accordance with a preferred embodiment of the present invention is shown. The mouse 100 includes a main body 1, a retractable supporting component 2, an elastic component 3, a magnetic attraction component 4 and a magnetic attraction element 5. In the preferred embodiment, the mouse 100 includes two magnetic attraction elements 5.

The main body 1 has a receiving chamber 10 penetrating through one end of the main body 1. The supporting component 2 is slidably arranged in the receiving chamber 10 to be retracted into or be pulled out from the receiving chamber 10 of the main body 1. An upper portion of the main body 1 is equipped with the magnetic attraction component 4 located to a top of the receiving chamber 10. A top of the supporting component 2 is equipped with the magnetic attraction element 5. In the preferred embodiment, the two magnetic attraction elements 5 are arranged on the top of the supporting component 2. The mouse 100 further includes a stopping structure 602 arranged between the main body 1 and the supporting component 2 for limiting the supporting component 2 from being retracted into the main body 1. The stopping structure 602 is configured to limit the supporting component 2 sliding into the receiving chamber 10. Correspondingly, the stopping structure 602 is configured to limit the supporting component 2 being retracted into the receiving chamber 10.

One end of the elastic component 3 is connected to the main body 1, and the other end of the elastic component 3 is connected to the supporting component 2. When the supporting component 2 is pulled out to be in place, the elastic component 3 is stretched, and the magnetic attraction element 5 moves outward and along with the supporting component 2 to a position towards the magnetic attraction component 4. The supporting component 2 moves upward under a magnetic force action between the magnetic attraction component 4 and the magnetic attraction element 5. The supporting component 2 moves upward under an action of a magnetic force between the magnetic attraction component 4 and the two magnetic attraction elements 5, and the stopping structure 602 limits the supporting component 2 which moves upward from sliding into the receiving chamber 10 by limiting the supporting component 2 moving upward, correspondingly, the stopping structure 602 limits the supporting component 2 which moves upward from being retracted into the receiving chamber 10 by limiting the supporting component 2 moving upward.

When the supporting component 2 which is located at a pull-out status is pressed downward, the magnetic attraction element 5 moves downward and away from the magnetic attraction component 4 and the stopping structure 602 is disengaged from the supporting component 2 to loose a limitation on the supporting component 2, the two magnetic attraction elements 5 move downward and away from the magnetic attraction component 4 and the stopping structure 602 is disengaged from the supporting component 2 to loose the limitation on the supporting component 2, the supporting component 2 is driven by a restoring force of the elastic component 3 to slide backward into the receiving chamber 10, correspondingly, the supporting component 2 is driven by the restoring force of the elastic component 3 to be retracted into the receiving chamber 10.

The mouse 100 includes the supporting component 2 which is able to be pulled out from or be retracted into the main body 1, so when the mouse 100 is needed to be used, the supporting component 2 is pulled out from the main body 1, and when the mouse 100 is needless of being used, the supporting component 2 is retracted into the main body 1, correspondingly, a purpose of reducing a volume of the mouse 100 is reached, and the mouse 100 is convenient to be carried. The mouse 100 truly reaches to be compatible with a portability and a usage hand feeling, and a usage joy of the user is able to be improved.

When the supporting component 2 of the mouse 100 is pulled out in place, an instantaneous location of the supporting component 2 is able to be realized by an action of the magnetic force between the magnetic attraction component 4 and the two magnetic attraction elements 5 to improve a usage experience of the user. The supporting component 2 is able to be limited by the elastic component 3 to be pulled inward under a stop of the stopping structure 602. In addition, because the elastic component 3 is arranged between the supporting component 2 and the main body 1, when the user wants to retract the supporting component 2 into the main body 1, an outer portion of the supporting component 2 is needed to be pressed lightly, and then the supporting component 2 is retracted into the receiving chamber 10 automatically under the action of the restoring force of the elastic component 3, an operation of the mouse 100 is convenient, and the usage joy of the user is increased. In an usage status of the mouse 100, the supporting component 2 and the main body 1 are able to be supported on a usage platform together. Because the magnetic attraction component 4 is arranged on the top of the receiving chamber 10, and the two magnetic attraction elements 5 are arranged on the top of the supporting component 2 so as to ensure that the supporting component 2 is without being retracted into the main body 1 on account of being easily and accidentally pressed on the mouse 100 in use, and ensure a usage reliability of the mouse 100.

Referring to FIG. 3 to FIG. 8, in some preferred embodiments, the magnetic attraction component 4 is made of metal, and the two magnetic attraction elements 5 are made of magnetic materials. In a specific illustration, the magnetic attraction component 4 is a single metal plate. An quantity of the magnetic attraction component 4 is one. A middle of one end of a top plate 11 of the main body 1 is recessed inward to form an indentation 19. The magnetic attraction component 4 is disposed in the indentation 19 of the top plate 11 of the main body 1. The two magnetic attraction elements 5 are two magnets. A quantity of the magnetic attraction elements 5 are two. Two sides of the top of the supporting component 2 are recessed downward to form two locating holes 21. The two magnetic attraction elements 5 are accommodated in the two corresponding locating holes 21 which is arranged on the supporting component 2. Specific forms and arrangement ways of the magnetic attraction component 4 and the two magnetic attraction elements 5 are without being limited to the above-mentioned embodiment. In another preferred embodiment, the magnetic attraction component 4 is able to be a magnet, and the two magnetic attraction elements 5 are able to be made of the metal. Or both of the magnetic attraction component 4 and the two magnetic attraction elements 5 are able to be the magnets.

Referring to FIG. 1 to FIG. 8, in the preferred embodiment, middles of inner surfaces of two sides of the main body 1 are recessed oppositely to form two guiding slots 60 extending along a front-to-rear direction. Middles of upper portions of the inner surfaces of the two sides of the main body 1 protrude towards each other to form two restricting portions 63. The two guiding slots 60 are arranged at two opposite side walls of the receiving chamber 10. Several portions of a rear end of two sides of the supporting component 2 protrude outward to form a plurality of guiding portions 22. The plurality of the guiding portions 22 are able to slide in the two corresponding guiding slots 60 for guiding the supporting component 2 to be retracted into or pulled out from the main body 1. A cooperation between the plurality of the guiding portions 22 and the two guiding slots 60 is beneficial for the supporting component 2 to be pulled out from the main body 1 reliably, and to be retracted into the main body 1 reliably. In another preferred embodiment, two rear ends of the two sides of the supporting component 2 protrude oppositely outward to form two guiding portions 22. The two guiding portions 22 are able to slide in the two corresponding guiding slots 60 for guiding the supporting component 2 to be retracted into or pulled out from the main body 1.

In the preferred embodiment, several portions of tops of front ends of the two guiding slots 60 protrude upward to form a plurality of up-shift slots 61 for holding the plurality of the guiding portions 22. When the supporting component 2 is pulled out in place, the plurality of the guiding portions 22 move to positions corresponding to the plurality of the up-shift slots 61. When the supporting component 2 moves upward under the magnetic force between the magnetic attraction component 4 and the two magnetic attraction elements 5, the plurality of the guiding portions 22 move upward into the plurality of the up-shift slots 61. When the supporting component 2 which is located at the pull-out status is pressed downward, the plurality of the guiding portions 22 move downward into the plurality of the guiding slots 60. The plurality of the up-shift slots 61 are connected with the tops of the front ends of the two guiding slots 60 to provide up-shift spaces for the plurality of the guiding portions 22 at the time of the supporting component 2 moving upward.

In order to ensure a stability of the supporting component 2 at the time of the supporting component 2 being pulled out, a rear wall of each up-shift slot 61 forms a retaining wall 62. The stopping structure 602 includes the plurality of the guiding portions 22 and the retaining walls 62 of the plurality of the up-shift slots 61. When the supporting component 2 moves upward, the plurality of the guiding portions 22 move upward into the plurality of the up-shift slots 61 and then are blocked by the retaining walls 62 of the plurality of the up-shift slots 61. In the preferred embodiment, when the supporting component 2 is located at the pull-out status, because the retaining walls 62 of the plurality of the up-shift slots 61 block the plurality of the guiding portions 22 of the supporting component 2, the supporting component 2 is prevented from being retracted into the main body 1 by the elastic component 3, and correspondingly, a stability of the supporting component 2 which is located at the pull-out status is effectively ensured.

In order to make sure that the supporting component 2 is retracted into or pulled out from the main body 1 reliably, at least two portions of the two sides of the supporting component 2 protrude outward to form at least two spaced guiding portions 22 along the front-to-rear direction. Each guiding portion 22 is shown as a cylindrical shape. The tops of the front ends of the two guiding slots 60 are connected with at least two spaced up-shift slots 61 along the front-to-rear direction. When the supporting component 2 moves upward, the at least two guiding portions 22 move upward into the at least two up-shift slots 61.

In specific, each guiding slot 60 is arched upward and is shown as an arc shape. A convex top of each guiding slot 60 is disposed towards upward. Because the plurality of the guiding portions 22 slide in and are guided in the two guiding slots 60, the supporting component 2 moves downward at the same time of the supporting component 2 being pulled out. When the supporting component 2 is located at the pull-out status, the mouse 100 is entirely arched upward. An outer end of the supporting component 2 and the other end of the main body 1 away from the supporting component 2 are together configured to be used for supporting the mouse 100. When the mouse 100 is used, the outer end of the supporting component 2 is supported on the usage platform so as to ensure that the supporting component 2 is without being retracted into the main body 1 on account of being easily and accidentally pressed on the mouse 100 in use, and ensure the usage reliability of the mouse 100.

In the preferred embodiment, the mouse 100 further includes two guiding components 6. The main body 1 further includes the two guiding components 6 and a bottom frame 101. The two guiding components 6 are mounted to inner surfaces of two sides of the bottom frame 101. Middles of the inner surfaces of the two sides of the bottom frame 101 protrude towards each other to form two hooks 102. The two guiding components 6 are fastened to two sides of the receiving chamber 10, respectively. The two guiding slots 60 and the plurality of the up-shift slots 61 are formed in inner sides of the two guiding components 6. Middles of inner surfaces of the two guiding components 6 are recessed oppositely to form the two guiding slots 60. Middles of the two guiding slots 60 are recessed oppositely to form two gaps 65. The two gaps 65 penetrate through middles of two side walls of the two guiding slots 60 close to the two sides of the bottom frame 101. Middles of upper portions of the inner surfaces of the two guiding components 6 protrude towards each other to form the two restricting portions 63. Middles of upper portions of outer surfaces of the two guiding components 6 are recessed inward to form two lacking grooves 64. Middles of bottoms of two sides of the top plate 11 of the main body 1 protrude towards the two guiding components 6 to form two engaging portions 111. The top plate 11 of the main body 1 is mounted on the bottom frame 101 and the two guiding components 6. The two engaging portions 111 of the top plate 11 are inserted into the two lacking grooves 64, and the two engaging portions 111 are engaged with the two hooks 102 of the bottom frame 101 of the main body 1. Because each guiding component 6 is formed and disposed individually, the two guiding slots 60, the plurality of the up-shift slots 61 and other constructions of the mouse 100 are convenient to be manufactured, and a cost of the mouse 100 is easily lowered. In specific, each guiding component 6 is entirely shown as a plate shape, and the two guiding components 6 are attached to two side walls of the receiving chamber 10.

Referring to FIG. 1 to FIG. 8 again, in some preferred embodiments, the supporting component 2 has an extending portion 23, and a connecting portion 24 connected with a lower portion of an inner end surface of the extending portion 23. An upper portion of the inner end surface of the extending portion 23 is defined as a stair surface 25 located above the connecting portion 24. The plurality of the guiding portions 22 are disposed on two sides of the connecting portion 24. The extending portion 23 and the connecting portion 24 are entirely shown as a cambered board shape. The supporting component 2 further includes an assembling board 26 connected between the connecting portion 24 and the lower portion of the inner end surface of the extending portion 23. The connecting portion 24 extends rearward and is slightly arched upward. The connecting portion 24 projects rearward and upward, and projects beyond the assembling board 26.

At least one portion of the top plate 11 of the main body 1 is shown as the cambered board shape to fit with the extending portion 23 and the connecting portion 24. When the supporting component 2 is retracted into the receiving chamber 10 and is located at the retracted status, the extending portion 23 approaches or abuts against the top plate 11, and when the supporting component 2 is pulled out from the receiving chamber 10 and is located at the pull-out status, the extending portion 23 slides out from the receiving chamber 10 completely, the connecting portion 24 abuts upward against the top plate 11 of the main body 1. Designs of the extending portion 23 and the connecting portion 24 of the supporting component 2 of the mouse 100 are beneficial for a cooperation stability between the supporting component 2 and the main body 1.

Figure 10:
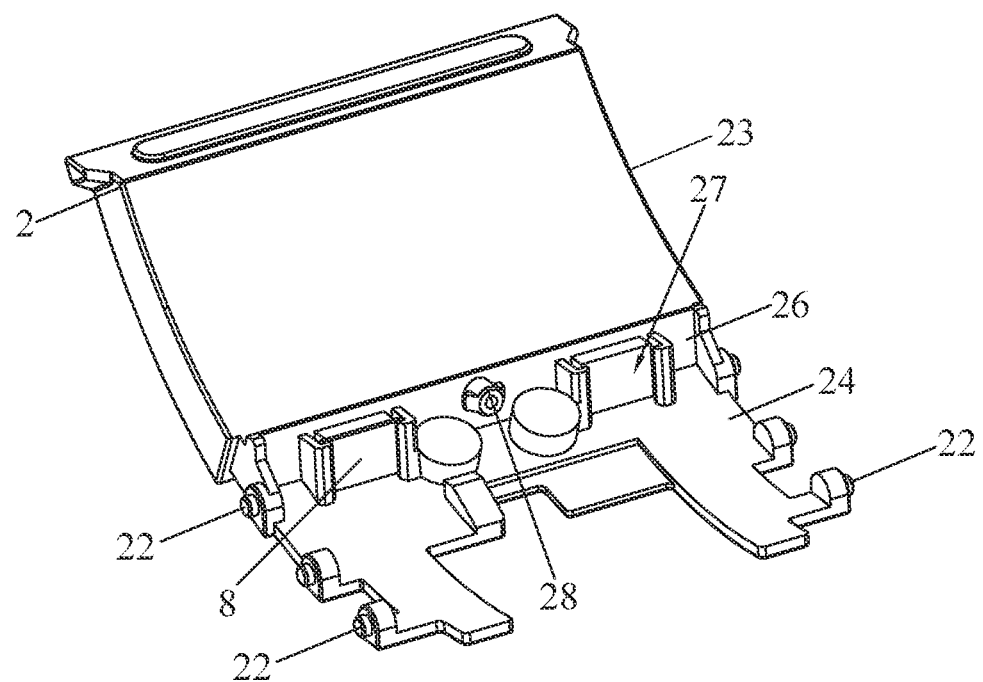
FIG. 10 shows a partial assembling diagram of the mouse in accordance with the present invention, wherein a supporting component and two magnetic attraction structures of the mouse are assembled.

Referring to FIG. 1 to FIG. 10, in some preferred embodiments, the mouse 100 further includes two magnetic attraction parts 7 and two magnetic attraction structures 8. When the supporting component 2 is retracted into the receiving chamber 10, the two magnetic attraction structures 8 move inward along with the supporting component 2, and the two magnetic attraction structures 8 are attracted with the two magnetic attraction parts 7. The supporting component 2 is beneficial for being more stably kept in the retracted status by a design of the mouse 100, and in a process of the supporting component 2 being converted into the retracted status, the magnetic force between the two magnetic attraction parts 7 and the two magnetic attraction structures 8 is able to assist for the supporting component 2 to be retracted into the receiving chamber 10 so as to be in the retracted status.

Referring to FIG. 1 to FIG. 10 again, in some preferred embodiments, an inside of the main body 1 is equipped with the two magnetic attraction parts 7 accommodated in a middle of the receiving chamber 10, and a lower portion of a middle of the supporting component 2 is equipped with the two magnetic attraction structures 8. The two magnetic attraction parts 7 are another two magnets, and the two magnetic attraction structures 8 are metal plates. Nevertheless, the two magnetic attraction parts 7 and the two magnetic attraction structures 8 are without being limited by any particular characteristics of provided embodiments, any embodiment that is able to make the two magnetic attraction parts 7 and the two magnetic attraction structures 8 generate a mutual attraction force therebetween is acceptable.

Figure 11:
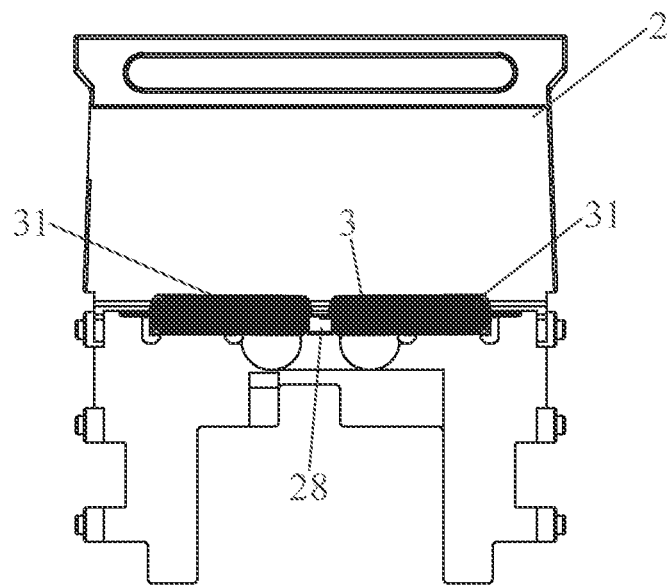
FIG. 11 shows another partial assembling diagram of the mouse in accordance with the present invention, wherein an elastic component and the supporting component of the mouse are assembled.

Referring to FIG. 1 to FIG. 11, in specific, the main body 1 is equipped with a battery storage 12. The battery storage 12 is located in the receiving chamber 10. The battery storage 12 is recessed inward and towards a top of the receiving chamber 10. The battery storage 12 is mounted on a bottom wall of the main body 1. Two sides of one edge of a top wall of the battery storage 12 facing towards the one end of the main body 1 are recessed inward to form two fixing grooves 13 spaced from each other. The two magnetic attraction parts 7 which are the two magnets are fixed in the two fixing grooves 13, respectively. Two sides of a rear surface of the assembling board 26 has two holding troughs 27 arranged corresponding to the two fixing grooves 13. The two magnetic attraction structures 8 which are the metal plates are assembled in the two holding troughs 27.

In some preferred embodiments, the elastic component 3 includes two springs 31. Two sides of the bottom wall of the receiving chamber 10 protrude upward to form two first fixing pillars 14 located in front of the battery storage 12. One end of each spring 31 is worn around one first fixing pillar 14. A middle of a rear surface of the assembling board 26 protrudes rearward to form a second fixing pillar 28. The other ends of the two springs 31 are worn around the second fixing pillar 28 together. Due to a design of the two springs 31, the two first fixing pillars 14 and the second fixing pillar 28, when the supporting component 2 is retracted into the receiving chamber 10, the elastic component 3 is ensured to have enough restoring forces, and the elastic component 3 is also able to keep a balance of the mouse 100 at the time of the mouse 100 being retracted into the receiving chamber 10 and being pulled out from the receiving chamber 10. In specific, the two first fixing pillars 14 and the second fixing pillar 28 is without being limited by any particular characteristics of the provided embodiments.

Referring to FIG. 1 to FIG. 11 again, in order to facilitate an understanding of this present invention, a usage process of the mouse 100 in accordance with the preferred embodiments of the present invention are described in detail. Nevertheless, the mouse 100 in accordance with the present invention should be without being limited by any particular characteristics of the provided embodiments.

When the supporting component 2 is located in the retracted status, namely, the mouse 100 is located in an unused status, the extending portion 23 of the supporting component 2 is retracted into the receiving chamber 10, and the extending portion 23 of the supporting component 2 abuts against or approaches the top plate 11 of the main body 1, the connecting portion 24 is spaced from the top plate 11 of the main body 1. The two guiding portions 22 are located at inner ends of the two guiding slots 60 adjacent to the other end of the main body 1. The elastic component 3 is located at an original status, the two magnetic attraction structures 8 are attracted to the two magnetic attraction parts 7.

When the mouse 100 is in use, an outer end of the extending portion 23 exposed outside is pulled out to make the supporting component 2 overcome the magnetic force between the two magnetic attraction parts 7 and the two magnetic attraction structures 8 to be pulled out. At the moment, the plurality of the guiding portions 22 slide outward along the two guiding slots 60, and the elastic component 3 is continuously stretched until the supporting component 2 is pulled in place, in the meanwhile, the extending portion 23 fully slides out of the receiving chamber 10, and the plurality of the guiding portions 22 move to outer ends of the two guiding slots 60 and corresponding to the plurality of the up-shift slots 61, and two magnetic attraction elements 5 move to positions corresponding to the magnetic attraction component 4. The released supporting component 2 moves upward under a mutual action between the magnetic attraction component 4 and the two magnetic attraction elements 5.

At the moment, the connecting portion 24 of the supporting component 2 moves upward, and the connecting portion 24 abuts against the top plate 11, the plurality of the guiding portions 22 move upward to the plurality of the up-shift slots 61 and are blocked by the retaining walls 62 of the plurality of the up-shift slots 61 so as to limit the supporting component 2 being driven by the elastic component 3 to slide inward, and then the mouse 100 is able be placed on a tabletop or another position which is similar to the tabletop to be used.

When the mouse 100 is stored in need, the exposed extending portion 23 is lightly pressed downward, the supporting component 2 moves downward to disengage the two magnetic attraction elements 5 from the magnetic attraction component 4. The plurality of the guiding portions 22 move downward to the two guiding slots 60 without the magnetic force between the two magnetic attraction elements 5 and the magnetic attraction component 4, the supporting component 2 is driven by the elastic component 3 to move inward, so that the extending portion 23 is retracted into the receiving chamber 10, the connecting portion 24 restores to an inner end of the receiving chamber 10 adjacent to the other end of the main body 1, the plurality of the guiding portions 22 slide to the inner ends of the two guiding slots 60 adjacent to the other end of the main body 1, and the two magnetic attraction structures 8 restore to be attracted with the two magnetic attraction parts 7. In a process of the supporting component 2 sliding along the two guiding components 6 of the main body 1, the plurality of the guiding portions 22 are guided in the two guiding slots 60, and the two restricting portions 63 abut against two sides of a top surface of a rear end of the supporting component 2, so the two sides of the top surface of the rear end of the supporting component 2 are blocked by the two restricting portions 63, specifically, the two restricting portions 63 abut against two sides of a top surface of the connecting portion 24, so the two sides of the top surface of the connecting portion 24 are blocked by the two restricting portions 63. The two gaps 65 decrease contacting areas among the plurality of the guiding portions 22 and inner walls of the two guiding slots 60. The two gaps 65 are communicated with the two lacking grooves 64 respectively.

As described above, the mouse 100 includes the supporting component 2 which is able to be retracted into or slide out from the main body 1, so the mouse 100 is used by virtue of pulling out the supporting component 2 from the main body 1, and when the mouse 100 has no need of being used, the supporting component 2 is able to be retracted into the main body 1 for reaching a purpose of reducing a volume, consequently, the mouse 100 is carried conveniently, the mouse 100 truly reaches to be compatible with the portability and the better usage hand feeling, and the usage joy of the user is able to be improved. When the mouse 100 is pulled out in place, the instantaneous location of the supporting component 2 is able to be realized by the action of the magnetic force between the magnetic attraction component 4 and the two magnetic attraction elements 5 to improve the usage experience of the user. Furthermore, the supporting component 2 and the elastic component 3 are stopped by the stopping structure 602 to be limited from sliding into the receiving chamber 10, and because the elastic component 3 is disposed between the supporting component 2 and the main body 1, when the supporting component 2 is retracted into the main body 1 in need, the outer portion of the supporting component 2 is needed to be pressed lightly, and then the supporting component 2 is retracted into the receiving chamber 10 automatically under the action of the restoring force of the elastic component 3, the operation of the mouse 100 is simple and convenient, and the usage joy of the user is increased. In addition, when the mouse 100 is in the usage status, the supporting component 2 and the main body 1 are able to be supported on the usage platform together, because the magnetic attraction component 4 is arranged on the top of the receiving chamber 10, and the two magnetic attraction elements 5 are arranged on the top of the supporting component 2 so as to ensure that the supporting component 2 is without being retracted into the main body 1 on account of being easily and accidentally pressed on the mouse 100 in use, and ensure the usage reliability of the mouse 100. As a result, the mouse 100 is carried conveniently, and the usage hand feeling of the mouse 100 of the user is also without being affected.

What is claimed is:

1. A mouse, comprising:
   a main body having a receiving chamber penetrating through one end of the main body, an upper portion of the main body being equipped with a magnetic attraction component located to a top of the receiving chamber, an inside of the main body being equipped with two magnetic attraction parts accommodated in a middle of the receiving chamber, middles of upper portions of inner surfaces of two sides of the main body protruding towards each other to form two restricting portions;
   a supporting component slidably arranged in the receiving chamber to be retracted into or be pulled out from the receiving chamber of the main body, in a process of the supporting component sliding along the main body, two sides of a top surface of a rear end of the supporting component being blocked by the two restricting portions, a top of the supporting component being equipped with a magnetic attraction element, a lower portion of a middle of the supporting component being equipped with two magnetic attraction structures;
   a stopping structure arranged between the main body and the supporting component for limiting the supporting component from being retracted into the main body; and
   an elastic component, one end of the elastic component being connected to the main body, and the other end of the elastic component being connected to the supporting component,
   wherein when the supporting component is pulled out to be in place, the elastic component is stretched, and the magnetic attraction element moves outward and along with the supporting component to a position towards the magnetic attraction component, the supporting component moves upward under a magnetic force action between the magnetic attraction component and the magnetic attraction element, and the stopping structure limits the supporting component which moves upward from sliding into the receiving chamber by limiting the supporting component moving upward, correspondingly, the stopping structure limits the supporting component which moves upward from being retracted into the receiving chamber by limiting the supporting component moving upward, when the supporting component which is located at a pull-out status is pressed downward, the magnetic attraction element moves downward and away from the magnetic attraction component and the stopping structure is disengaged from the supporting component to loose a limitation on the supporting component, the supporting component is driven by a restoring force of the elastic component to slide backward into the receiving chamber, correspondingly, the supporting component is driven by the restoring force of the elastic component to be retracted into the receiving chamber, when the supporting component is retracted into the receiving chamber, the two magnetic attraction structures move inward along with the supporting component, and the two magnetic attraction structures are attracted with the two magnetic attraction parts.

2. The mouse as claimed in claim 1, wherein inner surfaces of two sides of the main body are recessed oppositely to form two guiding slots arranged at two opposite side walls of the receiving chamber, several portions of two sides of the supporting component protrude outward to form a plurality of guiding portions, the plurality of the guiding portions are able to slide in the two corresponding guiding slots for guiding the supporting component to be retracted into or pulled out from the main body.

3. The mouse as claimed in claim 2, wherein several portions of tops of front ends of the two guiding slots protrude upward to form a plurality of up-shift slots, when the supporting component is pulled out in place, the plurality of the guiding portions move to positions corresponding to the plurality of the up-shift slots, when the supporting component moves upward, the plurality of the guiding portions move upward into the plurality of the up-shift slots, when the supporting component which is located at the pull-out status is pressed downward, the plurality of the guiding portions move downward into the plurality of the guiding slots.

4. The mouse as claimed in claim 3, wherein a rear wall of each up-shift slot forms a retaining wall, the stopping structure includes the plurality of the guiding portions and the retaining walls of the plurality of the up-shift slots, when the supporting component moves upward, the plurality of the guiding portions move upward into the plurality of the up-shift slots and then are blocked by the retaining walls of the plurality of the up-shift slots.

5. The mouse as claimed in claim 3, wherein at least two portions of the two sides of the supporting component protrude outward to form at least two spaced guiding portions along a front-to-rear direction, the tops of the front ends of the two guiding slots are connected with at least two spaced up-shift slots along the front-to-rear direction, when the supporting component moves upward, the at least two guiding portions move upward into the at least two up-shift slots.

6. The mouse as claimed in claim 3, wherein each guiding slot is arched upward and is shown as an arc shape, a convex top of each guiding slot is disposed towards upward, the supporting component moves downward at the same time of the supporting component being pulled out, when the supporting component is located at the pull-out status, the mouse is entirely arched upward, an outer end of the supporting component and the other end of the main body away from the supporting component are together configured to be used for supporting the mouse.

7. The mouse as claimed in claim 3, wherein the supporting component has an extending portion, and a connecting portion connected with a lower portion of an inner end surface of the extending portion, an upper portion of the inner end surface of the extending portion is defined as a stair surface located above the connecting portion, the plurality of the guiding portions are disposed on two sides of the connecting portion, the extending portion and the connecting portion are entirely shown as a cambered board shape, at least one portion of a top plate of the main body is shown as the cambered board shape to fit with the extending portion and the connecting portion, when the supporting component is located at a retracted status, the extending portion approaches or abuts against the top plate, and when the supporting component is located at the pull-out status, the extending portion slides out from the receiving chamber completely, the connecting portion abuts upward against the top plate of the main body.

8. The mouse as claimed in claim 3, wherein middles of the two guiding slots are recessed oppositely to form two gaps, the two gaps decrease contacting areas among the plurality of the guiding portions and inner walls of the two guiding slots.

9. The mouse as claimed in claim 3, further comprising two guiding components fastened to two sides of the receiving chamber, respectively, the two guiding slots and the plurality of the up-shift slots being formed in inner sides of the two guiding components.

10. The mouse as claimed in claim 9, wherein middles of inner surfaces of the two guiding components are recessed oppositely to form the two guiding slots, the plurality of the guiding portions are able to slide in the two guiding slots.

11. The mouse as claimed in claim 9, wherein middles of upper portions of inner surfaces of the two guiding components protrude towards each other to form the two restricting portions, the supporting component has an extending portion, and a connecting portion connected with a lower portion of an inner end surface of the extending portion, the two restricting portions abut against two sides of a top surface of the connecting portion, so the two sides of the top surface of the connecting portion are blocked by the two restricting portions.

12. The mouse as claimed in claim 9, wherein middles of upper portions of outer surfaces of the two guiding components are recessed inward to form two lacking grooves.

13. The mouse as claimed in claim 12, wherein middles of bottoms of two sides of a top plate of the main body protrude downward towards the two guiding components to form two engaging portions, the main body further includes a bottom frame, the top plate of the main body is mounted on the bottom frame and the two guiding components, the two engaging portions of the top plate are inserted into the two lacking grooves.

14. The mouse as claimed in claim 13, wherein the two guiding components are mounted to inner surfaces of two sides of the bottom frame, middles of the inner surfaces of the two sides of the bottom frame protrude towards each other to form two hooks, the two engaging portions are engaged with the two hooks of the bottom frame of the main body.

15. The mouse as claimed in claim 1, wherein the elastic component includes two springs, two sides of a bottom wall of the receiving chamber protrude upward to form two first fixing pillars, one end of each spring is worn around one first fixing pillar, a middle of the supporting component protrudes to form a second fixing pillar, the other ends of the two springs are worn around the second fixing pillar together.

16. The mouse as claimed in claim 1, further comprising two magnetic attraction elements arranged on the top of the supporting component, the supporting component moving upward under an action of a magnetic force between the magnetic attraction component and the two magnetic attraction elements.

17. A mouse, comprising:
a main body having a receiving chamber penetrating through one end of the main body, an upper portion of the main body being equipped with a magnetic attraction component located to a top of the receiving chamber, an inside of the main body being equipped with two magnetic attraction parts accommodated in a middle of the receiving chamber, inner surfaces of two sides of the main body being recessed oppositely to form two guiding slots arranged at two opposite side walls of the receiving chamber, middles of the two guiding slots being recessed oppositely to form two gaps;

a supporting component slidably arranged in the receiving chamber to be retracted into or be pulled out from the receiving chamber of the main body, a top of the supporting component being equipped with a magnetic attraction element, a lower portion of a middle of the supporting component being equipped with two magnetic attraction structures, several portions of two sides of the supporting component protruding outward to form a plurality of guiding portions, the plurality of the guiding portions being able to slide in the two corresponding guiding slots for guiding the supporting component to be retracted into or pulled out from the main body, the two gaps decreasing contacting areas among the plurality of the guiding portions and inner walls of the two guiding slots;

a stopping structure arranged between the main body and the supporting component for limiting the supporting component from being retracted into the main body; and an elastic component, one end of the elastic component being connected to the main body, and the other end of the elastic component being connected to the supporting component, wherein when the supporting component is pulled out to be in place, the elastic component is stretched, and the magnetic attraction element moves outward and along with the supporting component to a position towards the magnetic attraction component, the supporting component moves upward under a magnetic force action between the magnetic attraction component and the magnetic attraction element, and the stopping structure limits the supporting component which moves upward from sliding into the receiving chamber by limiting the supporting component moving upward, correspondingly, the stopping structure limits the supporting component which moves upward from being retracted into the receiving chamber by limiting the supporting component moving upward, when the supporting component which is located at a pull-out status is pressed downward, the magnetic attraction element moves downward and away from the magnetic attraction component and the stopping structure is disengaged from the supporting component to loose a limitation on the supporting component, the supporting component is driven by the restoring force of the elastic component to be retracted into the receiving chamber, when the supporting component is retracted into the receiving chamber, the two magnetic attraction structures move inward along with the supporting component, and the two magnetic attraction structures are attracted with the two magnetic attraction parts.

18. A mouse, comprising:

a main body having a receiving chamber penetrating through one end of the main body, an upper portion of the main body being equipped with a magnetic attraction component located to a top of the receiving chamber;

two guiding components fastened to two sides of the receiving chamber, middles of inner surfaces of the two guiding components being recessed oppositely to form two guiding slots, several portions of tops of front ends of the two guiding slots protruding upward to form a plurality of up-shift slots, a rear wall of each up-shift slot forming a retaining wall, middles of upper portions of inner surfaces of the two guiding components protruding towards each other to form two restricting portions;

a supporting component slidably arranged in the receiving chamber to be retracted into or be pulled out from the receiving chamber, the supporting component having an extending portion, and a connecting portion connected with a lower portion of an inner end surface of the extending portion, a top of the supporting component being equipped with a magnetic attraction element, several portions of two sides of the supporting component protruding outward to form a plurality of guiding portions, the plurality of the guiding portions being able to slide in the two corresponding guiding slots, in a process of the supporting component sliding along the two guiding components, the plurality of the guiding portions being guided in the two guiding slots, and the two restricting portions abutting against two sides of a top surface of the connecting portion, so the two sides of the top surface of the connecting portion being blocked by the two restricting portions; and an elastic component, one end of the elastic component being connected to the main body, and the other end of the elastic component being connected to the supporting component, wherein when the supporting component is pulled out to be in place, the elastic component is stretched, and the magnetic attraction element moves outward and along with the supporting component to a position towards the magnetic attraction component, the supporting component moves upward under a magnetic force action between the magnetic attraction component and the magnetic attraction element, when the supporting component moves upward, the plurality of the guiding portions move upward into the plurality of the up-shift slots and then are blocked by the retaining walls of the plurality of the up-shift slots, when the supporting component which is located at a pull-out status is pressed downward, the magnetic attraction element moves downward and away from the magnetic attraction component, the plurality of the guiding portions move downward into the plurality of the guiding slots, the supporting component is driven by the restoring force of the elastic component to be retracted into the receiving chamber.

\* \* \* \* \*